(12) United States Patent
Thorstensen-Woll et al.

(10) Patent No.: US 11,724,863 B2
(45) Date of Patent: Aug. 15, 2023

(54) TABBED SEAL WITH OVERSIZED TAB

(71) Applicant: Selig Sealing Products, Inc., Forrest, IL (US)

(72) Inventors: Robert William Thorstensen-Woll, Barrie (CA); Steven A. Brucker, Gibson City, IL (US)

(73) Assignee: Selig Sealing Products, Inc., Forrest, IL (US)

( * ) Notice: Subject to any disclaimer, the term of this patent is extended or adjusted under 35 U.S.C. 154(b) by 0 days.

(21) Appl. No.: 17/258,369

(22) PCT Filed: Jul. 9, 2019

(86) PCT No.: PCT/US2019/041038
§ 371 (c)(1),
(2) Date: Jan. 6, 2021

(87) PCT Pub. No.: WO2020/014252
PCT Pub. Date: Jan. 16, 2020

(65) Prior Publication Data
US 2021/0292059 A1 Sep. 23, 2021

Related U.S. Application Data

(60) Provisional application No. 62/695,277, filed on Jul. 9, 2018.

(51) Int. Cl.
*B65D 51/20* (2006.01)
(52) U.S. Cl.
CPC ........ *B65D 51/20* (2013.01); *B65D 2251/009* (2013.01); *B65D 2251/0093* (2013.01); *B65D 2577/205* (2013.01)
(58) Field of Classification Search
CPC .............. B65D 51/20; B65D 2251/009; B65D 2251/0093; B65D 2251/0015;
(Continued)

(56) References Cited

U.S. PATENT DOCUMENTS 1,818,379 A 8/1931 Cain
2,768,762 A 10/1956 Guinet
(Continued)

FOREIGN PATENT DOCUMENTS

AT 501393 A1 8/2006
AT 11738 U1 4/2011
(Continued)

OTHER PUBLICATIONS

Patent Cooperation Treaty, International Search Report and Written Opinion of the International Searching Authority for International Application No. PCT/US2019/041038 dated Sep. 26, 2019, 13 pages.

*Primary Examiner* — Jennifer Robertson
*Assistant Examiner* — John Martin Hoppmann
(74) *Attorney, Agent, or Firm* — Fitch, Even, Tabin & Flannery, LLP

(57) ABSTRACT

Various enhancements of tabbed seals are provided herein with enhanced grasping functionality. Such enhancements include an oversized tab structure for increasing the overall surface area of the tab. In some forms, the tab has been configured such that the overall gripping tab is larger, but a portion thereof is temporarily adhered to the lower laminate, such as during seal and/or cap installation. Instead, the gripping tab includes a small free portion and then a second, temporarily bonded portion that can either release or rupture, permitting the overall grippable portion of the tab to be large.

25 Claims, 8 Drawing Sheets

(58) Field of Classification Search
CPC ............ B65D 1/0238; B65D 2577/205; B65D 55/026; B65D 77/2032; B65D 77/204; B65D 65/40; B65D 77/2024; B65D 77/2044; B65D 17/4011; B65D 17/4012; B65D 2517/0013; B65D 2543/00833; B65D 2577/2058; B65D 41/045; B65D 51/22; B65D 2517/5083; B65D 53/04; B65D 2517/5032; G09F 3/04; B32B 27/36; B32B 2266/025; B32B 2435/02; B32B 2307/31; B32B 2307/748; B32B 27/10; Y10T 428/2848; Y10T 428/2813; Y10T 428/2817; Y10T 428/1359
USPC ....... 220/459.5, 270; 215/232, 359.2, 359.9; 206/459.5; 428/35.7, 35.9, 349, 344, 200, 428/43, 66.3, 66.4, 198; 156/308.4, 73.1
See application file for complete search history.

(56) References Cited

U.S. PATENT DOCUMENTS

| | | |
|---|---|---|
| 3,235,165 A | 2/1966 | Jackson |
| 3,292,828 A | 12/1966 | Stuart |
| 3,302,818 A | 2/1967 | Balocca et al. |
| 3,460,310 A | 8/1969 | Adcock et al. |
| 3,556,816 A | 1/1971 | Nughes |
| 3,964,670 A | 6/1976 | Amneus |
| 3,990,603 A | 11/1976 | Brochman |
| 4,133,796 A | 1/1979 | Bullman |
| 4,206,165 A | 6/1980 | Dukess |
| 4,266,687 A | 5/1981 | Cummings |
| 4,396,655 A | 8/1983 | Graham |
| 4,556,590 A | 12/1985 | Martin |
| 4,582,735 A | 4/1986 | Smith |
| 4,588,099 A | 5/1986 | Diez |
| 4,595,116 A | 6/1986 | Carlsson |
| 4,596,338 A | 6/1986 | Yousif |
| 4,636,273 A | 1/1987 | Wolfersperger |
| 4,666,052 A | 5/1987 | Ou-Yang |
| 4,693,390 A | 9/1987 | Hekal |
| 4,735,335 A | 4/1988 | Torterotot |
| 4,741,791 A | 5/1988 | Howard |
| 4,762,246 A | 8/1988 | Ashley |
| 4,770,325 A | 9/1988 | Gordon |
| 4,771,903 A | 9/1988 | Levene |
| 4,781,294 A | 11/1988 | Croce |
| 4,801,647 A | 1/1989 | Wolfe, Jr. |
| 4,811,856 A | 3/1989 | Fischman |
| 4,818,577 A | 4/1989 | Ou-Yang |
| 4,837,061 A | 6/1989 | Smits |
| 4,863,061 A | 9/1989 | Moore |
| 4,867,881 A | 9/1989 | Kinzer |
| 4,889,731 A | 12/1989 | Williams |
| 4,917,949 A | 4/1990 | Yousif |
| 4,934,544 A | 6/1990 | Han |
| 4,938,390 A | 7/1990 | Markva |
| 4,960,216 A * | 10/1990 | Giles ................ B65D 51/20 220/258.2 |
| 4,961,986 A | 10/1990 | Galda |
| 5,004,111 A | 4/1991 | McCarthy |
| 5,012,946 A | 5/1991 | McCarthy |
| 5,015,318 A | 5/1991 | Smits |
| 5,053,457 A | 10/1991 | Lee |
| 5,055,150 A | 10/1991 | Rosenfeld |
| 5,057,365 A | 10/1991 | Finkelstein |
| 5,071,710 A | 12/1991 | Smits |
| 5,089,320 A | 2/1992 | Straus |
| 5,098,495 A | 3/1992 | Smits |
| RE33,893 E | 4/1992 | Elias |
| 5,106,124 A | 4/1992 | Volkman |
| 5,125,529 A | 6/1992 | Torterotot |
| 5,131,556 A | 7/1992 | Iioka |
| 5,149,386 A | 9/1992 | Smits |
| 5,178,967 A | 1/1993 | Rosenfeld |
| 5,197,618 A | 3/1993 | Goth |
| 5,217,790 A | 6/1993 | Galda |
| 5,226,281 A | 7/1993 | Han |
| 5,261,990 A | 11/1993 | Galda |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galda |
| 5,560,989 A | 10/1996 | Han |
| 5,598,940 A | 2/1997 | Finkelstein |
| 5,601,200 A | 2/1997 | Finkelstein |
| 5,615,789 A | 4/1997 | Finkelstein |
| 5,618,618 A | 4/1997 | Murschall |
| 5,669,521 A | 9/1997 | Wiening |
| 5,683,774 A | 11/1997 | Faykish |
| 5,702,015 A | 12/1997 | Giles |
| 5,709,310 A | 1/1998 | Kretz |
| 5,776,284 A | 7/1998 | Sykes |
| 5,851,333 A | 12/1998 | Fagnant |
| 5,860,544 A | 1/1999 | Brucker |
| 5,871,112 A | 2/1999 | Giles |
| 5,887,747 A | 3/1999 | Burklin |
| 5,915,577 A | 6/1999 | Levine |
| 5,975,304 A | 11/1999 | Cain |
| 5,976,294 A | 11/1999 | Fagnant |
| 6,056,141 A | 5/2000 | Navarini |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,234,386 B1 | 5/2001 | Drummond |
| 6,290,801 B1 | 9/2001 | Krampe |
| 6,312,776 B1 | 11/2001 | Finkelstein |
| 6,361,856 B1 | 3/2002 | Wakai |
| 6,378,715 B1 | 4/2002 | Finkelstein |
| 6,458,302 B1 | 10/2002 | Shifflet |
| 6,461,714 B1 | 10/2002 | Giles |
| 6,544,615 B2 | 4/2003 | Otten |
| 6,548,302 B1 | 4/2003 | Mao |
| 6,602,309 B2 | 8/2003 | Vizulis |
| 6,627,273 B2 | 9/2003 | Wolf |
| 6,635,137 B2 | 10/2003 | Giles |
| 6,669,046 B1 | 12/2003 | Sawada |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | Obrien |
| 6,916,516 B1 | 7/2005 | Gerber |
| 6,955,736 B2 | 10/2005 | Rosenberger |
| 6,959,832 B1 | 11/2005 | Sawada |
| 6,974,045 B1 | 12/2005 | Trombach |
| 6,986,930 B2 | 1/2006 | Giles |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,731,048 B2 | 6/2010 | Teixeira Alvares |
| 7,740,730 B2 | 6/2010 | Schedl |
| 7,740,927 B2 | 6/2010 | Yousif |
| 7,757,879 B2 | 7/2010 | Schuetz |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,025,171 B2 | 9/2011 | Cassol |
| 8,057,896 B2 | 11/2011 | Smelko |
| 8,129,009 B2 | 3/2012 | Morris |
| 8,201,385 B2 | 6/2012 | Mclean |

(56) References Cited

U.S. PATENT DOCUMENTS

| | | |
|---|---|---|
| 8,308,003 B2 | 11/2012 | O'Brien |
| 8,329,288 B2 | 12/2012 | Allegaert |
| 8,348,082 B2 | 1/2013 | Cain |
| 8,455,071 B2 * | 6/2013 | Lo .................. B65D 51/22 428/36.5 |
| 8,541,081 B1 | 9/2013 | Ranganathan |
| 8,703,265 B2 | 4/2014 | Thorstensen-Woll |
| 8,715,825 B2 | 5/2014 | Thorstensen-Woll |
| 8,852,725 B2 * | 10/2014 | Sachs ................ B65D 51/20 156/364 |
| 8,906,185 B2 | 12/2014 | Mclean |
| 8,944,264 B2 | 2/2015 | Frishman |
| 9,028,963 B2 | 5/2015 | Thorstensen-Woll |
| 9,102,438 B2 | 8/2015 | Thorstensen-Woll |
| 9,120,289 B2 * | 9/2015 | Chang ................... B32B 7/14 |
| 9,193,513 B2 | 11/2015 | Thorstensen-Woll |
| 9,221,579 B2 | 12/2015 | Thorstensen-Woll |
| 9,227,755 B2 | 1/2016 | Thorstensen-Woll |
| 9,278,506 B2 | 3/2016 | Mclean |
| 9,278,793 B2 | 3/2016 | Thorstensen-Woll |
| 9,440,765 B2 | 9/2016 | Thorstensen-Woll |
| 9,440,768 B2 | 9/2016 | Thorstensen-Woll |
| 9,533,805 B2 | 1/2017 | Mclean |
| 9,676,513 B2 | 6/2017 | Thorstensen-Woll |
| 9,834,339 B2 | 12/2017 | Brucker |
| 9,956,741 B2 | 5/2018 | Planchard |
| 9,994,357 B2 | 6/2018 | Thorstensen-Woll |
| 10,000,310 B2 | 6/2018 | Thorstensen-Woll |
| 10,150,590 B2 | 12/2018 | Thorstensen-Woll |
| 10,196,174 B2 | 2/2019 | Thorstensen-Woll |
| 10,259,626 B2 | 4/2019 | Thorstensen-Woll |
| 10,556,732 B2 | 2/2020 | Cassidy |
| 10,604,315 B2 | 3/2020 | Thorstensen-Woll |
| 10,899,506 B2 | 1/2021 | Thorstensen-Woll |
| 10,934,069 B2 | 3/2021 | Clark |
| 10,954,032 B2 | 3/2021 | Thorstensen-Woll |
| 11,059,644 B2 | 7/2021 | Cassidy |
| 2001/0023870 A1 | 9/2001 | Mihalov |
| 2001/0031348 A1 | 10/2001 | Jud |
| 2002/0028326 A1 | 3/2002 | Lhila |
| 2002/0068140 A1 | 6/2002 | Finkelstein |
| 2003/0087057 A1 | 5/2003 | Blemberg |
| 2003/0108714 A1 | 6/2003 | Razeti |
| 2003/0168423 A1 | 9/2003 | Williams |
| 2003/0196418 A1 | 10/2003 | O'Brien |
| 2004/0013862 A1 | 1/2004 | Brebion |
| 2004/0028851 A1 | 2/2004 | Okhai |
| 2004/0043165 A1 | 3/2004 | Van Hulle |
| 2004/0043238 A1 | 3/2004 | Wuest |
| 2004/0109963 A1 | 6/2004 | Zaggia |
| 2004/0197500 A9 | 10/2004 | Swoboda |
| 2004/0211320 A1 | 10/2004 | Cain |
| 2005/0003155 A1 | 1/2005 | Huffer |
| 2005/0048307 A1 | 3/2005 | Schubert |
| 2005/0100718 A1 | 5/2005 | Peiffer |
| 2005/0208242 A1 | 9/2005 | Smelko |
| 2005/0208244 A1 | 9/2005 | Delmas |
| 2005/0218143 A1 | 10/2005 | Niederer |
| 2005/0279814 A1 | 12/2005 | Drummond |
| 2006/0000545 A1 | 1/2006 | Nageli |
| 2006/0003120 A1 | 1/2006 | Nageli |
| 2006/0003122 A1 | 1/2006 | Nageli |
| 2006/0068163 A1 | 3/2006 | Giles |
| 2006/0124577 A1 | 6/2006 | Ross |
| 2006/0151415 A1 | 7/2006 | Smelko |
| 2006/0278665 A1 | 12/2006 | Bennett |
| 2007/0003725 A1 | 1/2007 | Yousif |
| 2007/0007229 A1 | 1/2007 | Yousiff |
| 2007/0014897 A1 | 1/2007 | Ramesh |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0135159 A1 | 6/2008 | Bries |
| 2008/0145581 A1 | 6/2008 | Tanny |
| 2008/0156443 A1 | 7/2008 | Schaefer |
| 2008/0169286 A1 | 7/2008 | Mclean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | Mclean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | Obrien |
| 2010/0213193 A1 | 8/2010 | Helmlinger |
| 2010/0221483 A1 | 9/2010 | Gonzalez Carro |
| 2010/0279041 A1 | 11/2010 | Mathew |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | Mclean |
| 2011/0147353 A1 | 6/2011 | Kornfeld |
| 2011/0152821 A1 | 6/2011 | Kornfeld |
| 2012/0000910 A1 | 1/2012 | Ekkert |
| 2012/0043330 A1 | 2/2012 | Mclean |
| 2012/0067896 A1 | 3/2012 | Daffner |
| 2012/0070636 A1 | 3/2012 | Thorstensen-Woll |
| 2012/0103988 A1 | 5/2012 | Wiening |
| 2012/0111758 A1 | 5/2012 | Lo |
| 2012/0241449 A1 | 9/2012 | Frischmann |
| 2012/0285920 A1 | 11/2012 | Mclean |
| 2012/0288693 A1 | 11/2012 | Stanley |
| 2012/0312818 A1 | 12/2012 | Ekkert |
| 2013/0020324 A1 | 1/2013 | Thorstensen-Woll |
| 2013/0020328 A1 | 1/2013 | Duan |
| 2013/0045376 A1 | 2/2013 | Chen |
| 2013/0121623 A1 | 5/2013 | Lyzenga |
| 2013/0177263 A1 | 7/2013 | Duan |
| 2013/0248410 A9 | 9/2013 | Spallek |
| 2014/0001185 A1 | 1/2014 | Mclean |
| 2014/0061196 A1 | 3/2014 | Thorstensen-Woll |
| 2014/0061197 A1 | 3/2014 | Thorstensen-Woll |
| 2014/0186589 A1 | 7/2014 | Chang |
| 2014/0224800 A1 * | 8/2014 | Thorstensen-Woll ..................... G03H 1/0244 220/255 |
| 2014/0284331 A1 | 9/2014 | Thorstensen-Woll |
| 2014/0326727 A1 * | 11/2014 | Jouin .................. B65D 1/0238 206/459.5 |
| 2015/0053680 A1 | 2/2015 | Masato |
| 2015/0131926 A1 | 5/2015 | Lux |
| 2015/0158643 A1 | 6/2015 | Coker |
| 2015/0197385 A1 | 7/2015 | Wei |
| 2015/0225116 A1 | 8/2015 | Thorstensen-Woll |
| 2015/0321808 A1 * | 11/2015 | Thorstensen-Woll ..................... B65D 51/20 215/232 |
| 2016/0001952 A1 | 1/2016 | Kulkarni |
| 2016/0159546 A1 | 6/2016 | Cassidy |
| 2016/0185485 A1 | 6/2016 | Thorstensen-Woll |
| 2016/0325896 A1 | 11/2016 | Thorstensen-Woll |
| 2017/0173930 A1 | 6/2017 | Mclean |
| 2017/0253373 A1 | 9/2017 | Thorstensen-Woll |
| 2017/0259978 A1 | 9/2017 | Zamora |
| 2017/0291399 A1 | 10/2017 | Bourgeois |
| 2018/0079576 A1 | 3/2018 | Cassidy |
| 2018/0118439 A1 | 5/2018 | Thorstensen-Woll |
| 2018/0186122 A1 * | 7/2018 | Bourgeois ............... B32B 15/20 |
| 2019/0055070 A1 | 2/2019 | Brown |
| 2019/0092520 A1 | 3/2019 | Thorstensen-Woll |

(56) References Cited

U.S. PATENT DOCUMENTS

| | | | |
|---|---|---|---|
| 2019/0225369 A1 | 7/2019 | Thorstensen-Woll |
| 2019/0276209 A1 | 9/2019 | Clark |
| 2020/0079561 A1 | 3/2020 | Zamora |
| 2020/0087056 A1 | 3/2020 | Bosetti |
| 2020/0216256 A1 | 7/2020 | Miozzo |
| 2020/0282708 A1 | 9/2020 | Leuer |
| 2021/0188489 A1 | 6/2021 | Thorstensen-Woll |
| 2021/0237951 A1 | 8/2021 | Ostergren |
| 2021/0292060 A1 | 9/2021 | Thorstensen-Woll |

FOREIGN PATENT DOCUMENTS

| | | | |
|---|---|---|---|
| BR | 8200231 U | 9/2003 |
| BR | 0300992 A | 11/2004 |
| CA | 2015992 | 1/1991 |
| CA | 2203744 A1 | 10/1997 |
| CA | 2297840 A1 | 2/1999 |
| CN | 1301289 A | 6/2001 |
| CN | 1639020 A | 7/2005 |
| CN | 103193026 A | 7/2013 |
| CN | 104853994 A | 8/2015 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0135431 A1 | 3/1985 |
| EP | 0577432 A1 | 1/1994 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 1199253 A2 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| EP | 2230190 B1 | 8/2014 |
| EP | 3278972 B1 | 10/2020 |
| FR | 2693986 A1 | 1/1994 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H09110077 A | 4/1997 |
| JP | 2004212778 A | 7/2004 |
| JP | 2014015249 A * | 1/2014 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| TW | 201217237 A | 5/2012 |
| WO | 9702997 A1 | 1/1997 |
| WO | 9905041 A1 | 2/1999 |
| WO | 0066450 A1 | 11/2000 |
| WO | 2005009868 A1 | 2/2005 |
| WO | 2005030860 A1 | 4/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008113855 A1 | 9/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2013134665 A1 | 9/2013 |
| WO | 2014190395 A1 | 12/2014 |
| WO | 2015119988 A1 | 8/2015 |
| WO | 2016203251 A1 | 12/2016 |
| WO | 2017155946 A1 | 9/2017 |
| WO | 2018081419 | 5/2018 |

* cited by examiner

TABBED SEAL WITH OVERSIZED TAB

CROSS-REFERENCE TO RELATED APPLICATIONS

This application is a U.S. national phase application filed under 35 U.S.C. § 371 of International Application Number PCT/US2019/041038, filed Jul. 9, 2019, designating the United States which claims benefit of U.S. Provisional Application No. 62/695,277, filed Jul. 9, 2018, which is hereby incorporated herein by reference in its entirety.

FIELD OF THE INVENTION

The disclosure relates to pull-tab sealing members for sealing the mouth of a container, and more particularly, to pull-tab sealing members having a tab with enhanced gripping functionality.

BACKGROUND OF THE INVENTION

It is often desirable to seal the opening of a container using a removable or peelable seal, sealing member, or inner seal. Often a cap or other closure is then screwed or placed over the container opening capturing the sealing member therein. In use, a consumer typically removes the cap or other closure to gain access to the sealing member and then removes or otherwise peels the seal from the container in order to dispense or gain access to its contents.

Initial attempts at sealing a container opening utilized an induction- or conduction-type inner seal covering the container's opening where the seal generally conformed to the shape of the opening such that a circular container opening was sealed with a round disk approximately the same size as the opening. These prior seals commonly had a lower heat activated sealing layer to secure a periphery of the seal to a rim or other upper surface surrounding the container's opening. Upon exposing the seal to heat, the lower layer bonded to the container's rim. In many cases, these seals included a foil layer capable of forming induction heat to activate the lower heat seal layer. These prior seals tended to provide good sealing, but were often difficult for a consumer to remove because there was nothing for the consumer to grab onto in order to remove the seal. Often, the consumer needed to pick at the seal's edge with a fingernail because there was little or no seal material to grasp.

Other types of seals for containers include a side tab or other flange that extended outwardly from a peripheral edge of the seal. These side tabs are generally not secured to the container rim and provide a grasping surface for a consumer to hold and peel off the seal. These side tabs, however, extend over the side of the container rim and often protrude into a threaded portion of the closure. If the side tab is too large, this configuration may negatively affect the ability of the seal to form a good heat seal. The side tabs (and often the seal itself) can be deformed or wrinkled when the closure or other cap is placed on the container due to contact between the closure (and threads thereof) and tabbed part of the seal. To minimize these concerns, the side tabs are often very small; thus, providing little surface area or material for a consumer to grasp in order to remove the seal.

Yet other types of seals include a sealing member having a tab defined on the top of the seal. One approach of these prior seals includes a partial layer of coated pressure sensitive adhesive to secure the tab to a layer of metal foil. The tab was formed by a full layer extending across the entire surface of the sealing member, but the full layer was only bonded to half of the seal to form the tab. This type of top-tabbed seal offered the advantage of a larger tab, which provided more grasping area for the consumer to hold and peel off the seal, but required a full additional layer of material in order to form the tab. In other approaches, the seal may include a tab formed from the additional full layer of film combined with an additional full layer of adhesive utilizing a part paper or part polymer layer, called a tab stock, to form the tab. This part layer is inserted between the additional full layer of adhesive and lower seal portions to prevent the tab from sticking to the layers below, which formed the tab.

However, even in these tabbed forms, the tab may still be difficult for a user to grasp to remove the seal. For example, the tab itself may be slippery, thin, and/or not provide appropriate surface area for a user to maintain sufficient grip. This is especially problematic when all of these issues combine, such as in the case of a small container and/or tab along with a tab including materials with lower coefficients of friction. If a user cannot quickly and safely remove the tab, but instead must use some other means of removing the seal, the main function of the tab is lost.

SUMMARY OF THE INVENTION

Various enhancements of tabbed seals are provided herein with enhanced grasping functionality. The below described embodiments may be used separately or may be used with two or more of the enhancements in combination with one another.

In one form, the tabbed seal includes a greater surface area for the gripping tab than in many previous forms. However, prior seals that have attempted to incorporate larger free tabs have encountered difficulties such as the tab moving during cap installation and/or sealing. In this regard, the tab can fold on itself, crease, or otherwise move. This can deform the tab, make sealing difficult, and/or make cap installation difficult. To overcome these difficulties, a new tab has been configured such that the overall gripping tab is larger, but a portion thereof is temporarily adhered to the lower laminate, such as during seal and/or cap installation. Instead, the gripping tab includes a small free portion and then a second, temporarily bonded portion that can either release or rupture, permitting the overall grippable portion of the tab to be large. In some forms, the gripping tab portion may be at least 50% of the overall diameter, width, and/or upper surface area of the seal. In other forms, the gripping tab portion may be larger, such as 70%, 80%, and 90% or more. The remaining portion of the upper laminate may be more permanently adhered to the lower laminate so that the seal may be removed from the container.

According to one form, a tabbed sealing member for sealing to a rim surrounding a container opening is provided. The sealing member includes a lower laminate portion, an upper laminate portion, a release layer, a tab layer, and a bonding layer. The lower laminate portion includes a sealant layer for sealing to the rim of the container and a support layer above the sealant layer. The bonding layer partially bonds the upper laminate portion to the lower laminate portion to form a gripping tab, the gripping tab configured for removing the sealing member from the container opening. The gripping tab is formed having a first free portion defined by at least a portion of the tab layer, a second temporarily bonded portion, and a third permanently bonded portion. The second temporarily bonded portion is formed by at least a portion of the release layer and configured to release from one of the upper and lower laminate portions or rupture, permitting a user to grasp the first free portion and the second temporarily bonded portion to remove the tabbed sealing member from the container.

In accordance with one form, a tabbed sealing member for sealing to a rim surrounding a container opening is provided. The tabbed sealing member has an upper surface area. Further, the tabbed sealing member includes a lower laminate portion, an upper laminate portion, a release layer, and a bonding layer. The lower laminate portion includes a sealant layer for sealing to the rim of the container and a support layer above the sealant layer. The bonding layer partially bonds the upper laminate portion to the lower laminate portion to form a gripping tab. The gripping tab is configured for removing the sealing member from the container opening. The gripping tab is formed having a first free portion with an area less than 50% of the upper surface area, a second temporarily bonded portion, and a third permanently bonded portion. The second temporarily bonded portion is defined by at least a portion of the release layer. The first free portion and the second temporarily bonded portion have an area greater than 50% of the upper surface area, whereby a user can grasp the first free portion and the second temporarily bonded portion to remove the tabbed sealing member from the container.

According to one form, a laminate for forming a tabbed sealing member for sealing to a rim surrounding a container opening is provided. The laminate includes a lower laminate portion, an upper laminate portion, a release layer, a tab layer, and a bonding layer. The lower laminate portion includes a sealant layer for sealing to the rim of the container and a support layer above the sealant layer. The bonding layer partially bonds the upper laminate portion to the lower laminate portion to form a gripping tab when the laminate is formed into the tabbed sealing member. The gripping tab is configured for removing the sealing member from the container opening. The laminate has a width with a first portion of the width having the upper and lower laminate portions being unbonded to one another adjacent a portion of the tab layer, a second portion of the width where the upper and lower laminate portions are temporarily bonded to one another via at least a portion of the release layer, and a third portion of the width where the upper and lower laminate portions are permanently bonded to one another via at least a portion of the bonding layer.

In one form, the tab layer includes a tab stock having a release coating, the tab layer bonded to at least part of at least one of the upper and lower laminate portions.

In accordance with one form, the release layer forms part of at least one of the upper and lower laminate portions.

According to one form, the bonding layer forms part of at least one of the upper and lower laminate portions.

In one form, at least a portion of the release layer ruptures such that portions of the release layer remain with both of the upper and lower laminate portions.

In accordance with one form, at least a portion of the release layer separates from one of the upper and lower laminate portions.

According to one form, the tabbed sealing member further includes a foil layer and wherein the sealant layer is a heat seal layer.

In one form, the first free portion and the second temporarily bonded portion together define at least 50% of an upper surface area of the tabbed seal.

In accordance with one form, the first free portion and the second temporarily bonded portion together define at least 75% of an upper surface area of the tabbed seal.

These and other aspects may be understood more readily from the following description and the appended drawings.

DETAILED DESCRIPTION

Figure 1:
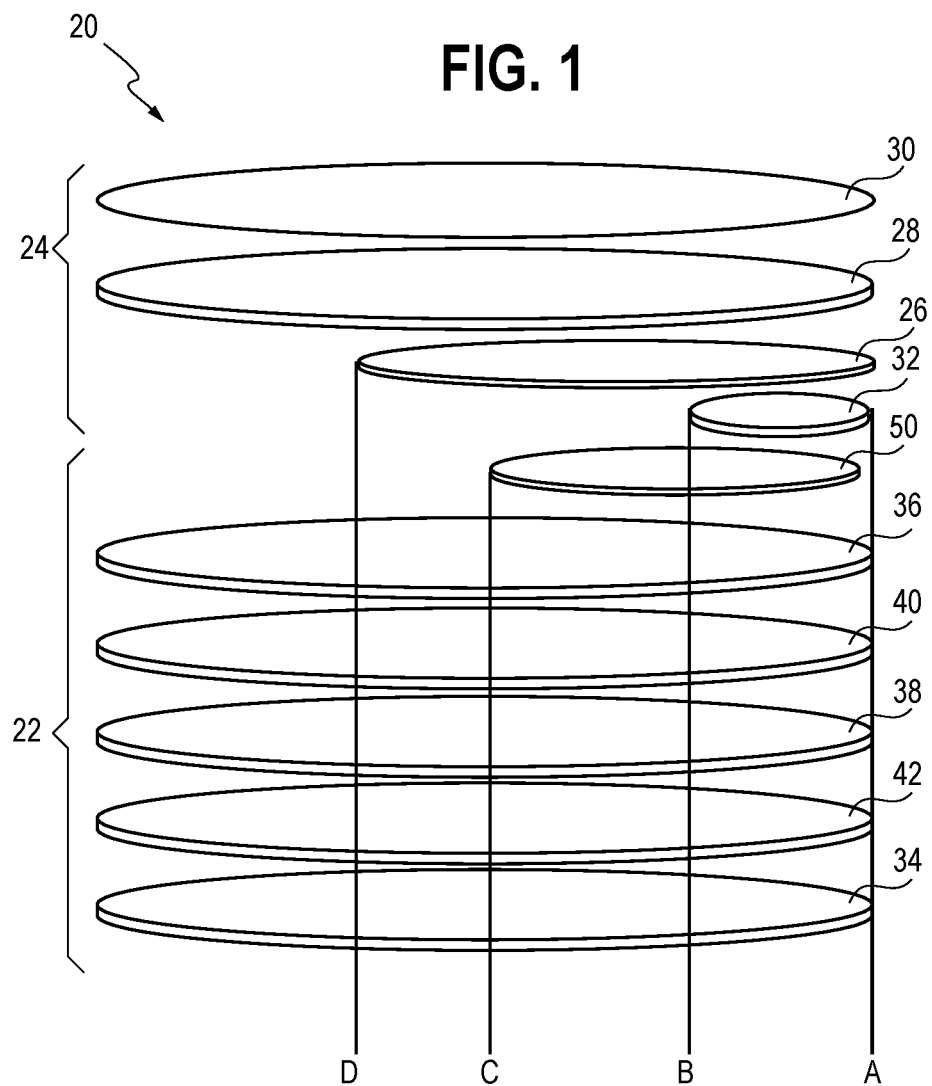
FIG. 1 is an exploded view of one form of a tabbed sealing member.

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

A pull tab sealing member for a container is described herein containing an upper laminate portion having a pull tab bonded with the upper laminate portion at least partially bonded to a lower laminate. The pull tab sealing member capable of being sealed to a container's mouth or opening, such as via a heat seal, pressure seal, and the like.

For simplicity, this disclosure generally may refer to a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in the figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner, but the releasable layers are generally heat activated.

As discussed above, tabbed seals can suffer from problems associated with a user's ability to properly grasp the tab. Tabbed sealing members have been modified as described herein to improve functionality beyond the current product lines offered. In some forms, the feel or gripability of the tab is important. Prior tab offerings oftentimes include a tab that is plastic, which can be slippery to the touch especially in wet environments as refrigerated products can accumulate condensation, or simply from cooking and washing hands the interaction with the tab can be slippery. This can be exacerbated by the use of release coatings or specialty plastic films that promote release from the foil or high-density polyethylene (HDPE) film layers below the tab. With this knowledge it is important to design tab features that reduce slippage on the tab or otherwise increase the tab surface area to provide an enhanced grip.

Referring to FIG. 1, one form of a tabbed sealing member 20 is shown having a lower laminate portion 22 and an upper laminate portion 24. The lower laminate portion 22 is secured to the upper laminate portion 24 via one or more bonding and/or adhesive layers. For example, in FIG. 1, bonding layer 26 and/or adhesive layer 28 can be used to secure the upper and lower laminate portions 22,24. It should be appreciated that both of layers 26,28 are not required, but may be used.

The upper laminate 24 may include other layers, such as support layer 30 and tab layer 32. Support layer 30 may take a variety of forms, such as a paperboard layer, a polymer film layer, a polymer foam layer, and the like. In one form, where support layer 30 is a paperboard layer, the adhesive layer 28 can be absorbed by the paperboard such that the support layer 30 separates from the bonding layer 26. In this form, the seal is considered a two-piece structure. In another form, the support layer 30 can be a polymer film and/or polymer foam that remains adhered to the bonding layer 26 and to the lower laminate portion 22. Tab layer 32 may be formed from a variety of materials, such as tab stock materials, polymers, and the like. Generally the tab layer 32 provides an area that separates the upper laminate portion 24 from the lower laminate portion 22 such that at least a portion of the tab layer 32 can be graspable. The tab layer 32 may also include a release coating, such as a silicon coating, to prevent the tab layer 32 from sticking to the lower laminate portion 22. It should be appreciated that the upper laminate portion 24 may also include additional layers and/or combinations of the above described layers.

The lower laminate portion 22 can include a variety of layers including, but not limited to a sealant layer 34. The sealant layer 34 is configured to adhere the sealing member 20 to a container (not shown). The sealant layer 34 can take a variety of forms, such as a heat seal, pressure sensitive adhesive, and the like. When configured as a heat seal, the sealant 34 can be heated in a variety of manners, such as conduction, convention, induction heating, and the like. For example, the lower laminate can include a membrane layer 36, such as a foil layer, that can be used in an induction heating process to provide heat to the sealant layer 34.

The lower laminate portion 22 can also include a polymer layer, such as polymer film layer 38. The lower laminate can also include adhesive layers 40,42 to adhere the various layers together. In other forms, the various layers can be extruded or otherwise directly applied to one another such that one or more of the adhesive layers are not needed in the lower laminate portion 22. Other layers such as polymer foam layers (not shown) can also be included. Further, the relative positions of the layers in the lower laminate can be modified. For instance, the membrane layer 36 can be positioned closer to the sealant layer 34, such as being swapped with the polymer film layer 38.

The sealing member 20 can also include a release layer 50. As shown in FIG. 1, the release layer 50 is positioned as part of the lower laminate portion 22. However, it should be appreciated that the release layer 50 can form part of the upper laminate portion 24 and/or be positioned between the lower and upper laminate portions 22,24. The release layer 50 may be formed from a variety of different materials such that the release layer is configured to release from one of the lower and upper laminate portions 22,24 and/or internally rupture and separate.

For example, in one form, the bonding layer 26 and the release layer 36 can each be a polyethylene terephthalate and ethylene vinyl acetate co-extruded layer. In this form, the bonding layer 26 and the release layer can be temporarily bonded to one another, but release as a user pulls on the free tab portion. In another form, the release layer 50 can be a paper-based layer such that the release layer 50 ruptures and separates over at least a portion of the layer.

As shown in FIG. 1, a small free tab is provided in the area between lines A and B whereby a user can separate the tab 32 from the release layer 50. This portion of the tab 32 is generally free for the user to grasp. During removal, the consumer peels the tab upward thereby extending the tab to a larger dimension for use in removing the seal. In this form, the area between lines B and C is peelable as an extension of the tab. This area can have a release layer that releases from at least one of the other layers and/or a material such as paper, that ruptures. The area between lines C and D is generally considered a permanent bond as it should not release during seal removal. When fully extended, the area between lines A and C forms a tab that can be grasped by a user.

In general, the free tab is loose and has air beneath since it is void of lamination. This results in movement while cutting during the closure lining process and can cause liner jams and rough edges on the perimeter of the cut liner. Minimizing the tab size relative to the liner's overall size is an advantage, but not practical for functionality. A novel way of eliminating this issue is to design a liner that seats flat and is peeled up or is extended by the consumer as the liner is lifted from the package. Large tabs have been known to twist during closure application at the filling process. Such a design could allow for a tab system to be greater than 50%. Such a design can result in a different removal dynamic which could be a benefit as consumers often tend to pull prior tabs in this manner.

Figure 2:
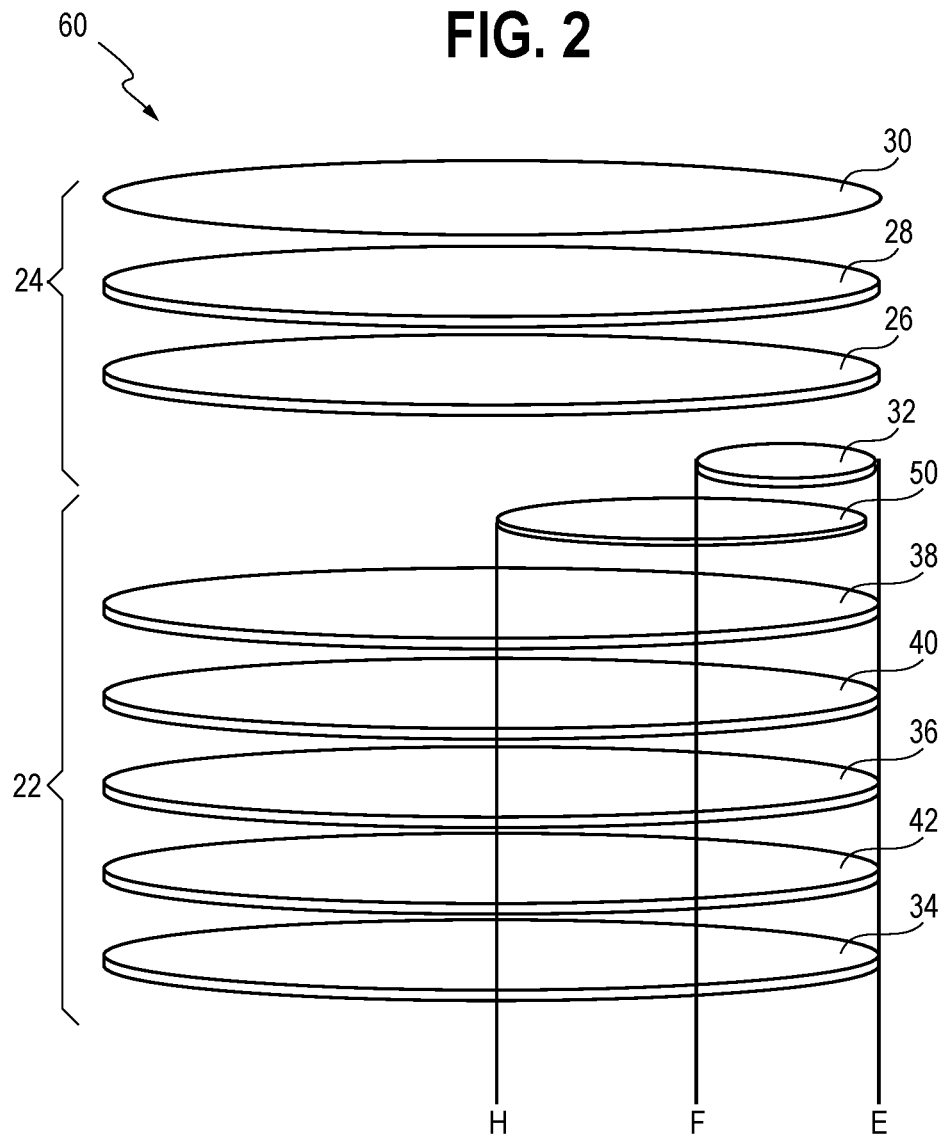
FIG. 2 is an exploded view of one form of a tabbed sealing member with a large tab.

Another form of a tabbed sealing member 60 is shown in FIG. 2. Many of the same and/or similar layers are used and include the same reference numbers such that these layers will not be specifically described. FIG. 2 is similar to FIG. 1 except that the bonding layer 26 extends the full width of the sealing member 60. Further, the membrane layer 36 and polymer film layer 38 have been switched. In this form, the area between lines E and F form the free tab for grasping. The area between lines F and H form the releasable area whereby a temporary bond is formed and then releases as a user peels up on the tab 50. The release layer 50 can release from the upper laminate portion 24 and/or internally rupture, such as in the case of a paper-based layer for the release layer 50.

Figure 3:
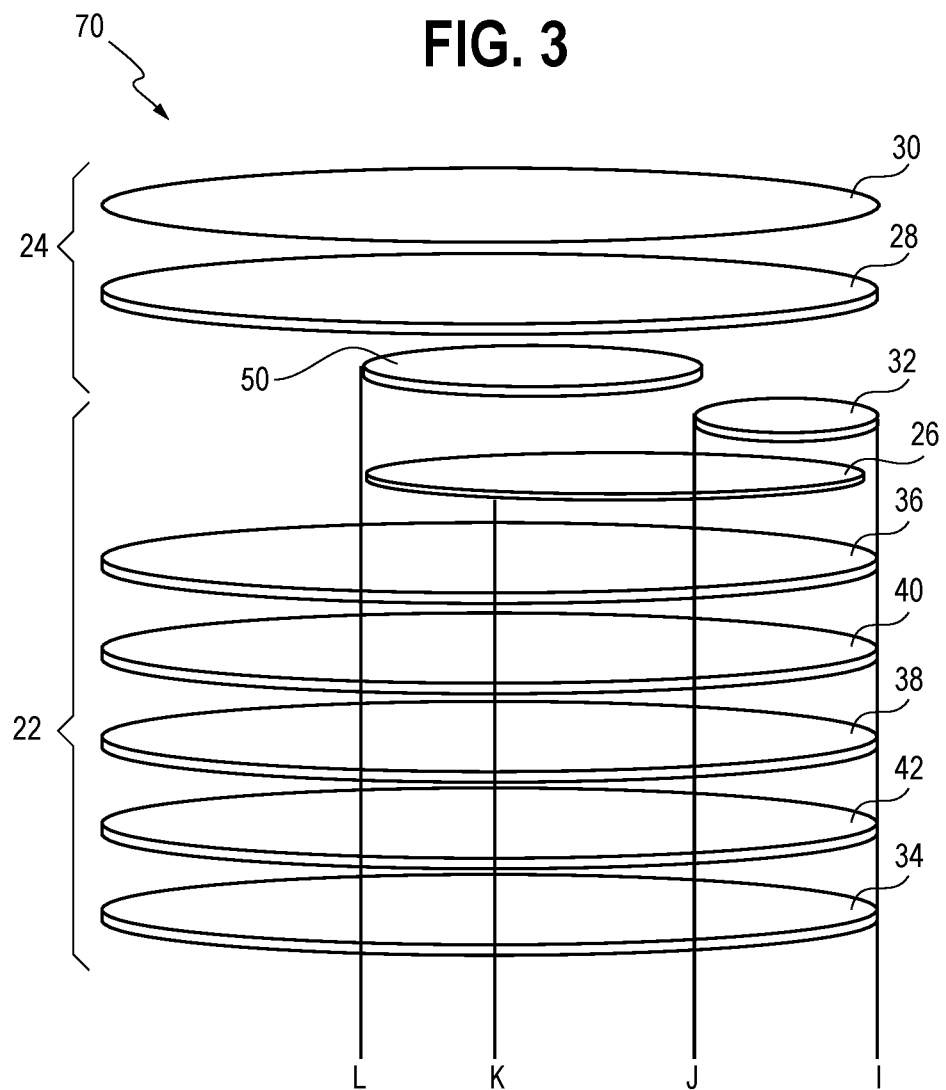
FIG. 3 is an exploded view of one form of a tabbed sealing member with a release layer that ruptures.

FIG. 3 illustrates a further configuration of a sealing member. More specifically, sealing member 70 is shown having many similar layers and configurations as in FIG. 1. In FIG. 3, the upper laminate portion 24 includes the release layer 50 while the lower laminate portion 22 includes the bonding layer 26. Further, the size and positioning of the release layer 50 has been modified. In this form, the release layer 50 is configured such that once fully released, the surface area of the graspable portion of the tab will be greater than 50% of the overall surface area of the tab.

More specifically, a free tab portion is the surface area between lines I and J as the tab layer 32 is separate and free from the bonding layer 26. In this form, the free tab area is less than 50% of the overall surface area of the sealing member 70. As a user pulls on the free tab area, the release layer 50 can separate from the bonding layer 26 and/or internally rupture. In this form, the graspable portion of the tab is between lines I and L. The area between lines I and K generally represents 50% of the overall surface area of the sealing member 70 such that the graspable area of the tab between lines I and L is greater than 50% of the overall surface area. It should be appreciated that the overall graspable area of the tab, such as when the release layer 50 has released and/or ruptured, is greater than 70%, greater than 75%, greater than 80%, greater than 85%, greater than 90%, or more of the overall surface area of the sealing member. In such forms, the graspable area of the tab is significantly larger than other tabs, but is also relatively secured during installation and sealing. This can help prevent tab movement as the free area of the tab during installation is 50% or less, 30% or less, 20% or less of the overall surface area.

Figure 4:
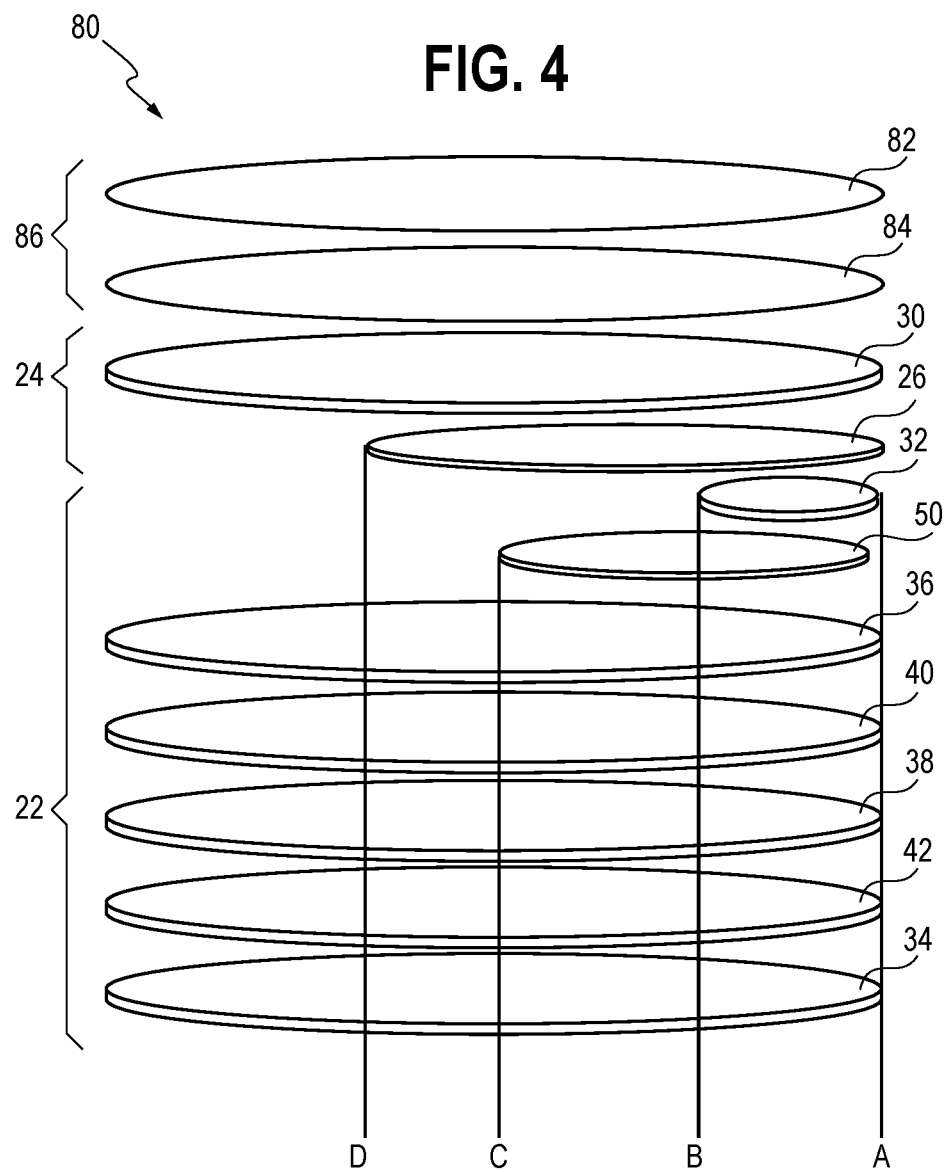
FIG. 4 is an exploded view of one form of a tabbed sealing member in a two-piece configuration.

FIG. 4 illustrates a two-piece form of a tabbed sealing member. More specifically, sealing member 80 includes many similar features as shown in FIG. 1. Sealing member 80 further includes a paperboard layer 82 and a temporary adhesive layer 84. In this form, the paperboard layer 82 and the temporary adhesive layer 84 form a separable component 86 that releases from the remainder of the sealing member 80 by the time a closure is removed from the container and prior to seal removal. In this form, the sealing member 80 may be placed in a closure, such as a cap, and then placed on a container. The sealing member 80 can then be heated such that the temporary adhesive layer 84 releases from the support layer 30. For example, the temporary adhesive layer 84 can be a wax layer that is absorbed by the paperboard layer 82. When a user removes the closure, the paperboard layer remains in the closure, exposing the upper laminate portion 24 and providing access to the free tab area between lines A and B.

Figure 5:
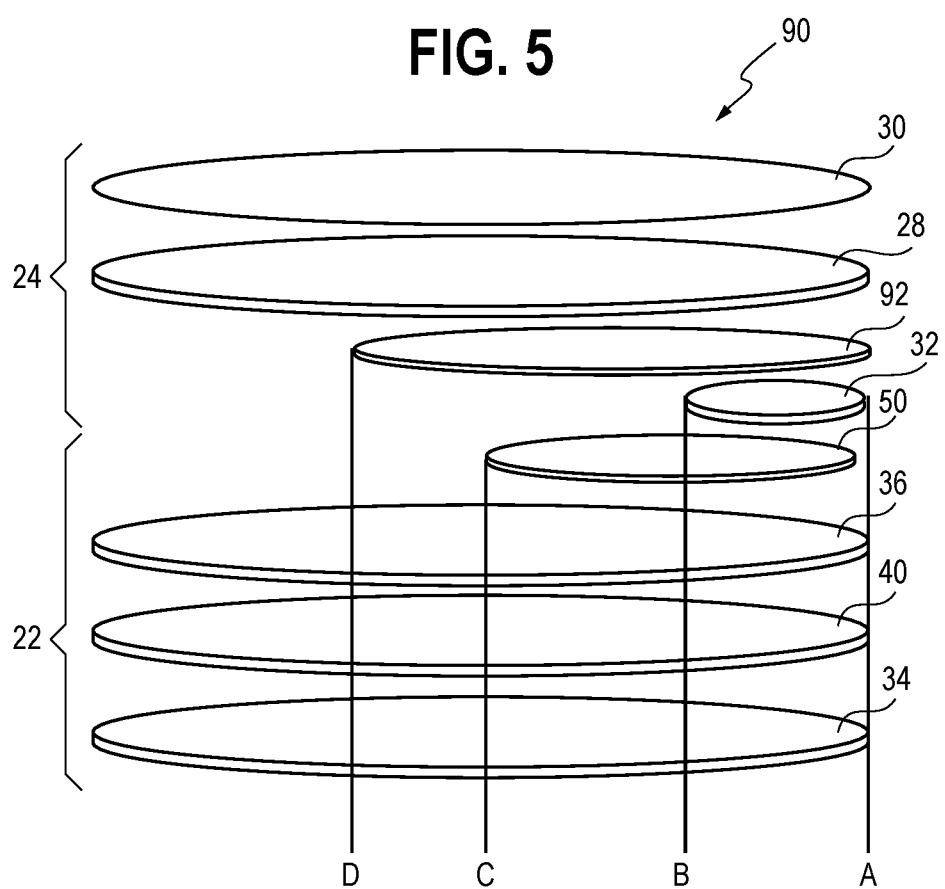
FIG. 5 is an exploded view of one form of a tabbed sealing member.

FIG. 5 illustrates a further form whereby fewer layers are included in the seal. More specifically, sealing member 90 is shown having similar features as those in FIG. 1. However, the sealing member 90 does not include polymer film layer 38. Further, sealing member 90 includes a further tamper indicating structure 92. The tamper indicating structure can include a further rupturable layer, such as a paper layer, hologram, or other similar structure.

In this form, the area between lines A and B forms a free tab while the area between lines B and C forms a releasable portion of the tab. The area between lines C and D is also releasable as the tamper indicating structure can rupture at least in the area between lines C and D. For example, the tamper indicating layer 92 can include paper and/or a hologram such that the layer will rupture. Therefore, a user can visually determine that at least the area between lines C and D appears different from other areas on the sealing member, such as between lines B and C.

Figure 6:
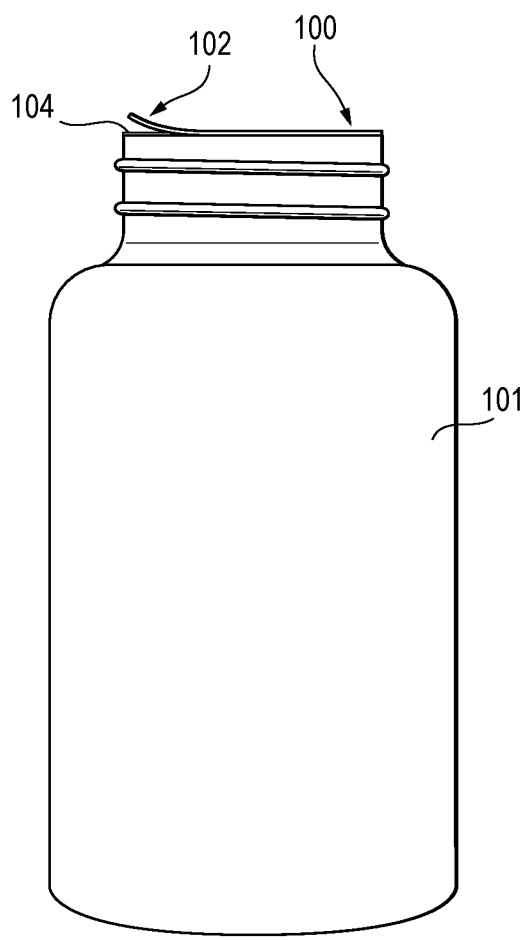
FIG. 6 is a side view of one form of a tabbed sealing member showing an unbonded portion of the tab.
Figure 7:
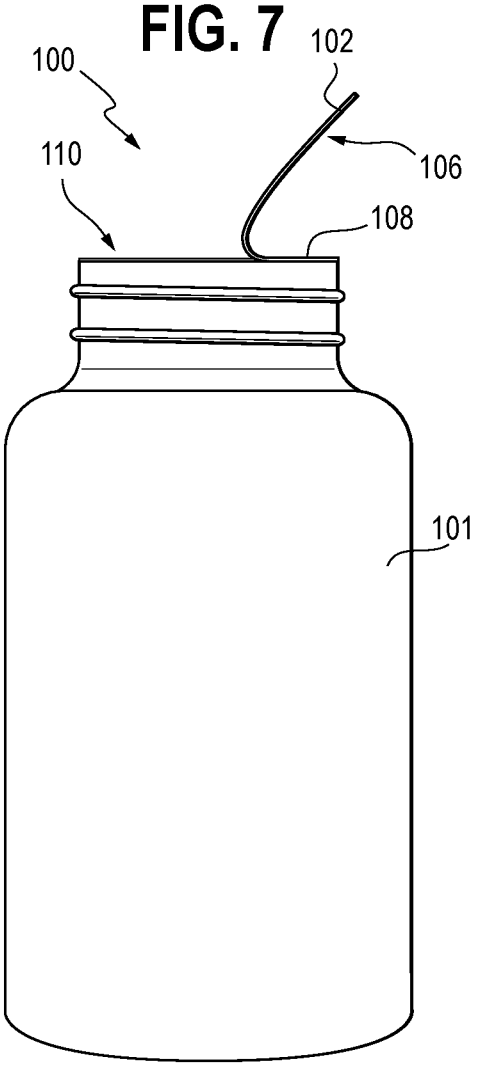
FIG. 7 is a side view of one form of a tabbed sealing member showing a release layer releasing from the lower laminate portion.

FIGS. 6 and 7 illustrate one form of a sealing member as it is being removed by a user. As shown in FIG. 6, sealing member 100 is shown on a container 101 whereby a free tab portion 102 is being lifted upwardly thereby exposing a portion of the lower laminate 104. FIG. 7 illustrates the free tab portion 102 being pulled further upwardly and across the sealing member 100. In this form, the release layer releases from at least one of the upper and lower laminate portions and/or ruptures. As this occurs, a fully extended tab portion 106 is provided for a user to grasp. The upper and lower laminate portions are bonded together at a permanently bonded portion 108. An exposed portion 110 of the lower laminate is then visible. From the position shown in FIG. 7, a user can then pull directly upwardly and/or back across towards the exposed portion 110 such that the sealing member 100 can be removed from the container 101.

Further, as shown in FIG. 7, the fully extended tab portion can be larger than 50% of the overall surface area of the sealing member. In some forms, the fully extended tab portion can be greater than 60%, 70%, 75%, 80%, 85%, 90% or more of the overall surface area of the sealing member. As such, the fully extended tab portion can provide for a much larger surface area for a user to grasp. Further, because the sealing member includes a much smaller free tab portion, with a temporarily bonded portion, the sealing member can be easily installed while minimizing binding or shifting of the tab during assembly and installation.

As shown in FIG. 7, generally the sealing member 100 will release from the container 101 and/or rupture in an area adjacent the permanently bonded portion 108. With such a structure, the force applied by the user can be focused in a small area adjacent the permanently bonded portion 108. This focused force, along with the enlarged tab provides for increased graspability of the tab and easier removal of the sealing member.

Figure 8:
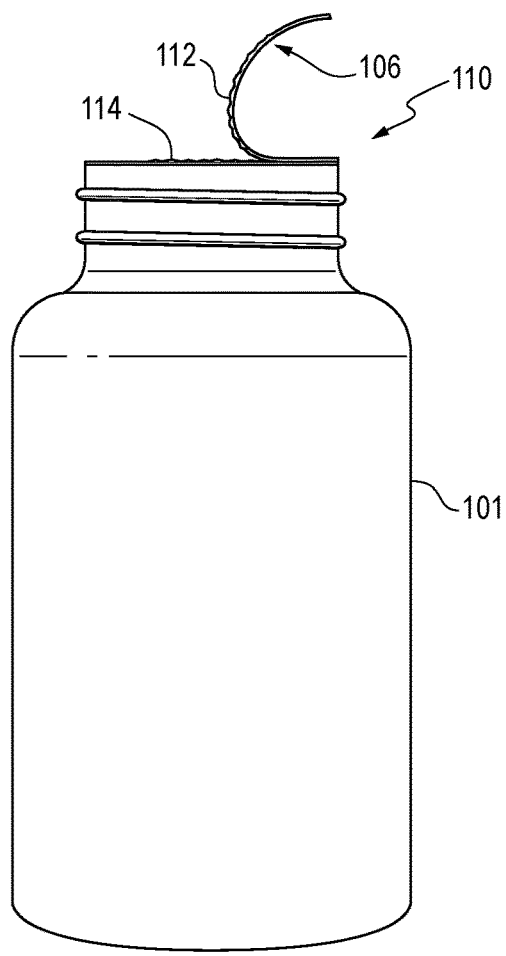
FIG. 8 is a side view of one form of a tabbed sealing member showing a release layer rupturing.

FIG. 8 illustrates a further sealing member 110 in a similar position as sealing member 100 in FIG. 7. In FIG. 8, sealing member 110 includes a release layer that ruptures. As shown in FIG. 8, the release layer ruptures, leaving a portion 112 on the fully extended tab portion 106 and a portion 114 on the lower laminate portion.

Figure 9:
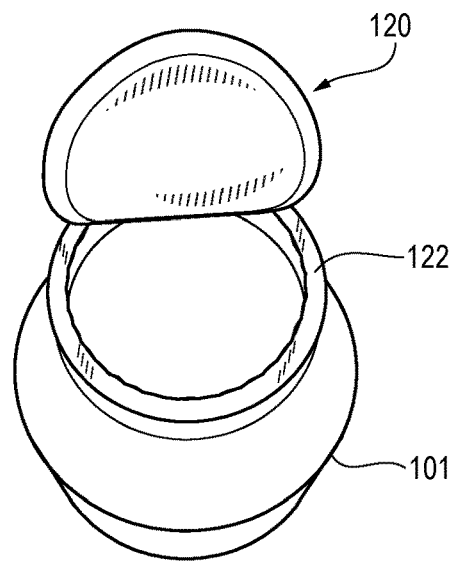
FIG. 9 is a top perspective view of a tabbed sealing member being removed from a container.

FIG. 9 illustrates a sealing member 120 after being fully extended as in either of FIG. 7 or 8, and then removed by pulling up and/or back across the sealing member. As shown in FIG. 9, in one form, at least a portion of the sealing member 120 can leave a residual ring 122 of one or more layers on a land area of the container 101. For example, one or more of the layers in the lower laminate portion 2, such as the membrane layer 36 and polymer film layer, can remain on the container as a further indicator of tamper evidence.

It should be appreciated that in some forms, all or nearly all of the sealing member may be fully removed from the container. For example, all of the layers of the sealing member may release from the container. In other forms, only the sealant layer or a portion thereof may remain on the container.

Figure 10:
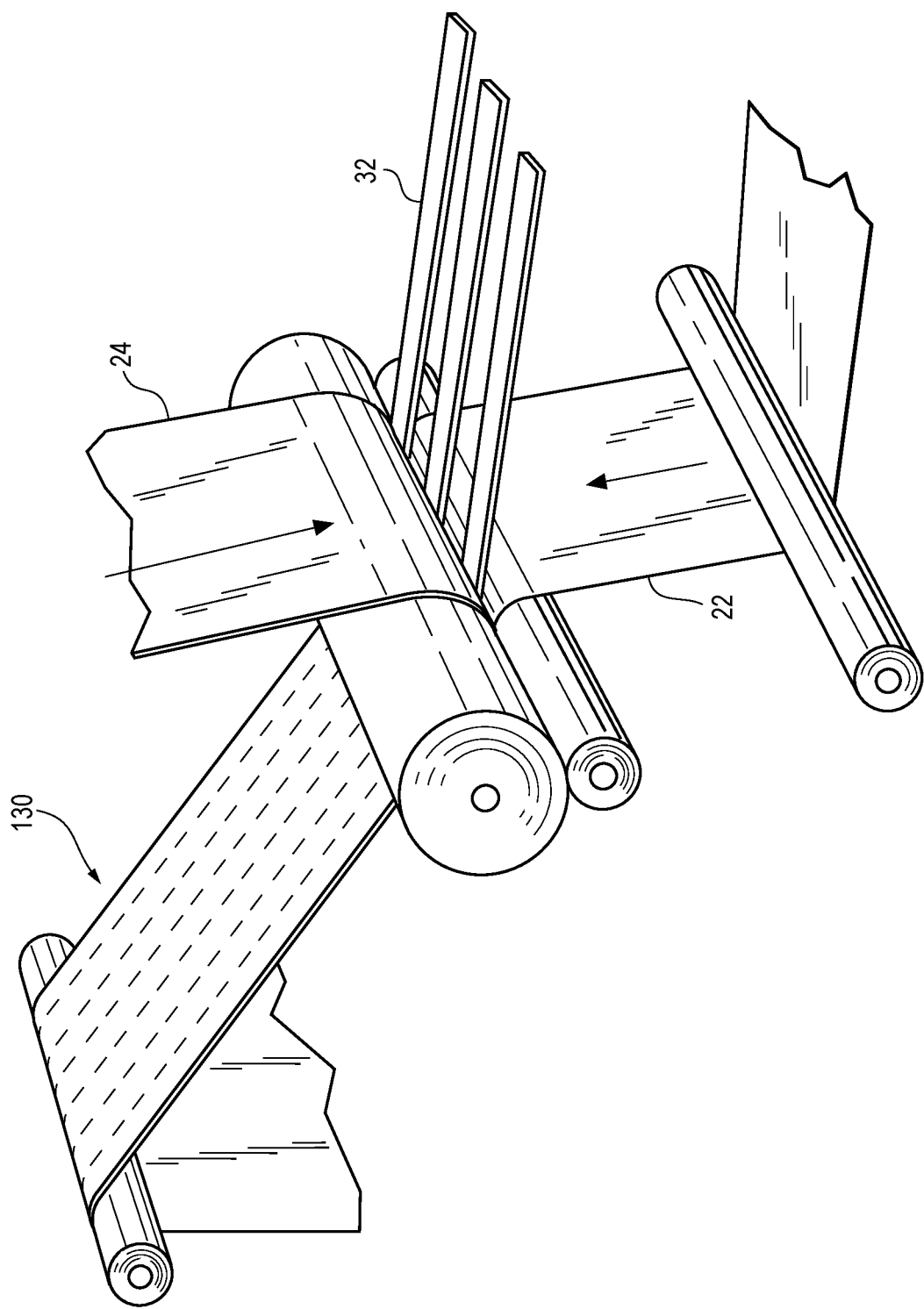
FIG. 10 is a perspective view of one form of assembling a laminate used to form a tabbed sealing member.

FIG. 10 illustrates one form of assembling a laminate used to form a sealing member. In this form, the upper laminate portion 24 is joined with the lower laminate portion 22 with the tab layer 32 therebetween to form a laminate 130. The laminate 130 can then be slit and/or cut to form the individual sealing members. The individual sealing members can take a variety of shapes, such as disc shaped.

In one form, the three tabbing components are preconstructed, slit and then applied to the base laminate Al/PET/Sealant. Peelability from the sub tab layer allows independence of the sub tab from the required bond strength of the tab.

It has been noted that the removal force of a sealing members is much lower when the peel is initiated as a chord further away from the traditional 50% tab or saddle peel of the traditional Lift N Peel™ or Top Tab™ half-moon tab designs. In testing the concept relative to weld seal or the new "Pharma peel" technology, data shows that both the consistency and force are improved considerably by positioning the peel initiation in this manner.

Pharma peel generally refers to technology discussed in PCT/US2017/058521. Such technology involves tabbed seals that may include features such as tamper indicating features. These tamper indicating features may include holograms and may also include constructions whereby a portion of the seal remains on the container rim. The seal can be configured such that this portion of the seal is fairly clean and generally limited to the container such that a large portion of the container opening is not obstructed by debris.

For example, such sealing members may eliminate the excessive debris left by prior tamper evident top-tabbed type inner seals. In one aspect, the sealing members are arranged and configured to isolate the residual debris, after removal of the sealing member from the container via the tab, to the land region of the container rim independent of the size or positioning of the tab on the top surface of the sealing member. In another aspect, the tabbed sealing members herein utilize a unique layered assembly to aid in achieving the isolated debris left as a ring of sealant and aluminum layer on the container rim.

It was determined that a 50% percent tab induction sealed in a 38 mm HDPE container with a trial version of Pharma Peel 17A120 at 1.5 seconds dwell time produced seals that functioned properly only 30% of the time when sampling 25 sealed containers. A further improvement to 50% success could be achieved by elevating the induction dwell from 1.5 to 1.8 seconds, however, the liner begins to show signs of thermal stress at this point. When producing a seal with a 70% tab (changing the physical position of the liner from diameter to a chord), the result was a 100% success rate in intended removal characteristics. Overall the seal removal force is greatly reduced, thus allowing easy entry to a package while maintaining tamper evidence.

Tab extension allows for additional tamper indicating attributes to be applied to the liner's functionality. Examples have been designed using paper similar in nature to Selig Sealing Products' Sure Tab™ technology, holograms, and other peelable technologies such as peel able co-ex technology. This additional layer allows for tab extension and during the peel up of the tab adds a second level of tamper indication.

In field applications there are situations whereby a standard 50% tab will twist and distort during closure application or removal. This can be attributed to the frictional resistance between the inside of the closure and the top side of the free tab. This issue is seen in higher frequency when there is a reseal liner housed in the closure such as a molded reseal liner or a traditional foam reseal gasket that does not contain adequate slip properties. A reduction in the size of the free tab to 30% has been used as a method of eliminating tab twisting. The technology presented herein would allow a 50% tab with only a 30% free tab.

The lower laminate portion and upper laminate portion may include a variety of different materials and layers. For instance, the lower laminate portion may include a metal foil, and the top surface of the lower laminate portion may be the metal foil. The lower laminate portion may also include a foamed polymer, or the top surface of the lower seal portion may be a polymer film selected from polyolefin materials and polyester materials.

Additional layers may be included in the upper and/or lower laminate portions such as polyethylene terephthalate (PET), nylon, or other structural polymer layer and may be, in some approaches, about 0.5 to about 1 mil thick. In some approaches, additional layers may be included in the lower laminate. It should be appreciated that the lower laminate may include any number of other layers, such as polymer layers, adhesives, polymer films, polymer foams and the like.

The lower sealant layer or heat seal layer may be composed of any material suitable for bonding to the rim of a container, such as, but not limited to, induction, conduction, or direct bonding methods. Suitable adhesives, hot melt adhesives, or sealants for the heat sealable layer include, but are not limited to, polyesters, polyolefins, ethylene vinyl acetate, ethylene-acrylic acid copolymers, surlyn, and other suitable materials. By one approach, the heat sealable layer may be a single layer or a multi-layer structure of such materials about 0.2 to about 3 mils thick. By some approaches, the heat seal layer is selected to have a composition similar to and/or include the same polymer type as the composition of the container. For instance, if the container includes polyethylene, then the heat seal layer would also contain polyethylene. If the container includes polypropylene, then the heat seal layer would also contain polypropylene. Other similar materials combinations are also possible.

The polymer layers used in the upper and/or lower laminates may take a variety of forms such as coatings, films, foams, and the like. Suitable polymers include but are not limited to, polyethylene, polypropylene, ethylene-propylene copolymers, blends thereof as well as copolymers or blends with higher alpha-olefins. By one approach, one or more of the polymer layers may be a blend of polyolefin materials, such as a blend of one or more high density polyolefin components combined with one or more lower density polyolefin components. In one form, one polymer layer may be a polyethylene film while another polymer layer may be a PET film. According to one form, the polyethylene film may have a thickness of about 5 to about 20 microns while the PET film may have a thickness of about 5 to about 20 microns.

A support layer may be optional in the laminate. If included, it may be polyethylene terephthalate (PET), nylon, or other structural polymer layer and may be, in some approaches, about 0.5 to about 1 mil thick.

The membrane layer may be one or more layers configured to provide induction heating and/or barrier characteristics to the seal. A layer configured to provide induction heating is any layer capable of generating heat upon being exposed to an induction current where eddy currents in the layer generate heat. By one approach, the membrane layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside a sealed container and, in some cases, also provide induction heating at the same time. Thus, the membrane layer may be one or more layers configured to provide such functionalities. By one approach, the membrane layer is about 0.3 to about 2 mils of a metal foil, such as aluminum foil, which is capable of providing induction heating and to function as an atmospheric barrier.

In some forms, the seals may include an insulation layer or a heat-redistribution layer. In one form, the insulation layer may be a foamed polymer layer. Suitable foamed polymers include foamed polyolefin, foamed polypropylene, foamed polyethylene, and polyester foams. In some forms, these foams generally have an internal rupture strength of about 2000 to about 3500 g/in. In some approaches, the foamed polymer layer 106 may also have a density less than 0.6 g/cc and, in some cases, about 0.4 to less than about 0.6 g/cc. In other approaches, the density may be from about 0.4 g/cc to about 0.9 g/cc. The foamed polymer layer may be about 1 to about 5 mils thick.

In other approaches, a non-foam heat distributing or heat re-distributing layer may be included. In such approach, the non-foam heat distributing film layer is a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the non-foam heat distributing polyolefin film layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal in one piece.

The heat-activated bonding layer may include any polymer materials that are heat activated or heated to achieve its bonding characteristics or application to the seal. By one approach, the heat-activated bonding layer may have a density of about 0.9 to about 1.0 g/cc and a peak melting point of about 145° F. to about 155° F. A melt index of the bonding layer 26 may be about 20 to about 30 g/10 min. (ASTM D1238). Suitable examples include ethylene vinyl acetate (EVA), polyolefin, 2-component polyurethane, ethylene acrylic acid copolymers, curable two-part urethane adhesives, epoxy adhesives, ethylene methacrylate copolymers and the like bonding materials.

The adhesives useful for any of the adhesive or tie layers described herein include, for example, ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials. Other suitable materials may include low density polyethylene, ethylene-acrylic acid copolymers, and ethylene methacrylate copolymers. By one approach, any optional adhesive layers may be a coated polyolefin adhesive layer. If needed, such adhesive layers may be a coating of about 0.2 to about a 0.5 mil (or less) adhesive, such as coated ethylene vinyl acetate (EVA), polyolefins, 2-component polyurethane, ethylene acrylic acid copolymers, curable two-part urethane adhesives, epoxy adhesives, ethylene methacrylate copolymers and the like bonding materials.

In one aspect, the tab may be formed by a full layer or partial layer of material combined with a partial width composite adhesive structure that includes a polyester core with upper and lower adhesives on opposite sides thereof. This partial composite adhesive structure bonds the upper laminate to the lower laminate to form the gripping tab.

In other aspects of this disclosure, the upper laminate of the seal does not extend the full width of the sealing member in order to define the gripping tab. To this end, the pull-tab sealing members herein may also combine the advantages of a tabbed sealing member with a large gripping tab defined completely within the perimeter of the seal, but achieve such functionality with less material (in view of the part layers of the upper laminate) and permit such a tab structure to be formed on many different types of pre-formed lower laminates. The partial upper laminate structure is advantageous, in some approaches, for use with a seal configured for large or wide mouth containers, such as containers with an opening from about 30 to about 100 mm (in other approaches, about 60 to about 100 mm). These seals may also be used with 38 mm or 83 mm container openings, or can be used with any sized container.

In further aspects of this disclosure, the sealing members herein may include a pull or grip tab defined in the upper laminate portion wholly within a perimeter or circumference of the sealing member wherein an upper surface of the sealing member is partially defined by the upper laminate portion and partially defined by the lower laminate portion. The seals of this aspect allow consumers to remove the sealing member using the tab (as in a conventional pull-tab seal) and/or puncture the sealing member by piercing the exposed lower laminate portion to provide push/pull functionality depending on the preference of the consumer.

In the various embodiments, the seals of the present disclosure defining a tab wholly within a perimeter or circumference of the seal (formed by a full or partial layer) also provide an improved ability for the tabbed sealing member to function in a two-piece seal and liner combination. In a two-piece seal and liner combination, the tabbed sealing member is temporarily adhered across its top surface to a liner. After container opening and removal of a cap or closure, the sealing member stays adhered to the container mouth and the liner separates and remains in the container's cap.

In some prior versions of two-piece seal and liner assemblies, the bottom layer of the sealing member is a heat seal layer that is activated by heating, such as by induction or conduction heating, in order to adhere or bond an outer periphery of the sealing member to a rim surrounding the mouth of a container. In the two-piece seal and liner combination, an upper surface of the sealing member is temporarily adhered to a lower surface of the liner by a release layer, which is often a heat-activated release layer, such as an intervening wax layer. During heating to bond the sealing member to the container, heat not only activates the lower heat seal layer, but also travels upwardly through the seal to melt the intervening wax across the entire surface of the sealing member to separate the liner from the sealing member. Often, the melted wax is absorbed by the liner in order to permit easy liner separation from the sealing member. As can be appreciated, for this sealing member and liner combination to function properly, the intervening wax layer needs to be melted across the entire surface of the sealing member. If the wax is not melted evenly all the way across the sealing member upper surface, the liner may not properly separate from the lower seal portion.

The various layers of the sealing member are assembled via coating adhesives, applying films, and/or a heat lamination process forming a sheet of the described layers. Extrusion lamination may also be used. The resulting laminate sheet of the sealing members can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. The sealing layer may be a pressure sensitive adhesive, the force of attaching the closure to the container can activate the adhesive.

Various enhancements of tabbed seals are provided herein with enhanced grasping functionality. The below described embodiments may be used separately or may be used in combination with one another and with the features described above.

In one form, the tabbed seal includes an anti-slip coating that is positioned on at least one of a top and a bottom surface of the gripping tab. Previously, some tabs included release coatings to prevent the tab from adhering to the lower laminate and preventing the user from grasping the seal. An anti-slip coating may be applied to at least a portion of the gripping tab to enhance a user's ability to grasp and maintain a hold of the gripping tab.

Such anti-slip coatings can include a variety of materials including, but not limited to materials having increased coefficients of friction, such as rubber or rubberized materials and the like. The anti-slip coatings may also include a combination of materials. The anti-slip coating may also be used in a variety of thicknesses, as desired, and in view of the number and thicknesses of other coatings used in the seal.

In a similar form, the gripping tab may include a polymer adhesive layer on at least a portion of at least one of an upper and a lower surface of the gripping tab. The polymer adhesive layer may provide a tackier gripping surface so that the gripping tab is less slippery. However, the polymer adhesive layer should also be configured such that it does not prevent the gripping tab from releasing from the lower laminate portion. The polymer adhesive layer on the underside of the tab stock may be formed from a variety of different materials. Such materials include, but are not limited to, EVA and other modified co-polymers that are tackier or more grippable than release coatings and therefore a structure made in this manner leaves the underside of the tab less slippery.

In yet another form, the gripping tab may be enhanced by including embossing and/or texturizing. This type of enhancement can be positioned on at least one of an upper and a lower surface of the gripping tab. In yet another portion, this type of enhancement may be configured to extend entirely through the gripping tab from the upper surface to the lower surface. For example, the gripping tab may be embossed in a process such that the entire structure of the gripping tab includes a texture.

Texturization or embossing of one or more layers in the upper laminate, such as the insulating layer, imparts a textured surface to the liner. Depending on the depth and geometry of the embossed pattern various degrees of grip enhancement can be imparted. The depth and geometry of the pattern can be varied, as desired. The depth may also be varied depending on the overall desired thickness of the seal, the thickness of the layers in the tab, the grip of the tab, and the like.

For example, one or more of polymer layers can be embossed or otherwise be provided with a surface roughness. By embossing the polymer layer(s), the non-smooth resulting surface may help impart desired roll release properties to the laminate and help minimize blocking when it is unwound prior to cutting into individual seals. Further, the grain or surface roughness, in some approaches, tends to reduce the surface contact between the outer layer and any liner or cap applied over the sealing member. This grain or surface roughness tends to result in a reduction in removal force of a cap or adjacent liner (in a two-piece seal) in view of the decreased surface contact between the outer layer and any adjacent surface cap or liner surface. Therefore, the embossed surface cannot only enhance the user's ability to grasp the tab, but may also enhance other production processes, as described above.

Further enhancements may also be utilized, such as by thickening various locations of the tab. In these forms, a much thicker portion of the tab is provided to help a user grasp the gripping tab. Adding a much thicker component to the end of the tab would provide the consumer with a physical stop to aid in gripping and removing the liner system. The thickened portion can be positioned to be toward an outer edge as well as an inner portion. Further, the thick portion can be positioned above and/or below various layers in the upper laminate. It should be appreciated that the thickened portion can also be positioned between other layers in the upper laminate.

The thickened portion can be made from a variety of different materials, including, but not limited to, any of the various materials for any of the layers described herein. Further, the thickness of the thickened material can vary as needed to provide the desired overall tab thickness.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of Applicant's contribution. The actual scope of the protection sought is intended to be defined in the following claims when viewed in their proper perspective based on the prior art.

What is claimed is:

1. A tabbed sealing member for sealing to a rim surrounding a container opening, the sealing member comprising: a lower laminate portion including a sealant layer for sealing to the rim of the container and a support layer above the sealant layer; an upper laminate portion; a release layer; a tab layer; and a bonding layer partially bonding the upper laminate portion to the lower laminate portion to form a gripping tab, the gripping tab configured for removing the sealing member from the container opening, wherein the gripping tab is formed having a first free portion defined by at least a portion of the tab layer, a second temporarily bonded portion that releases or ruptures prior to the tabbed seal being removed from the container, and a third permanently bonded portion that does not release or rupture prior to seal removal; and wherein the second temporarily bonded portion extends continuously between the first free portion and the third permanently bonded portion, the second temporarily bonded portion formed by at least a portion of the release layer and configured to release from one of the upper and lower laminate portions or rupture, permitting a user to grasp the first free portion and the second temporarily bonded portion to remove the tabbed sealing member from the container.

2. The tabbed sealing member of claim 1, wherein the tab layer includes a tab stock having a release coating, the tab layer bonded to at least part of at least one of the upper and lower laminate portions.

3. The tabbed sealing member of claim 1, wherein the release layer forms part of at least one of the upper and lower laminate portions.

4. The tabbed sealing member of claim 1, wherein the bonding layer forms part of at least one of the upper and lower laminate portions.

5. The tabbed sealing member of claim 1, wherein at least a portion of the release layer ruptures such that portions of the release layer remain with both of the upper and lower laminate portions.

6. The tabbed sealing member of claim 1, wherein at least a portion of the release layer separates from one of the upper and lower laminate portions.

7. The tabbed sealing member of claim 1, further comprising a foil layer and wherein the sealant layer is a heat seal layer.

8. The tabbed sealing member of claim 1, wherein the first free portion and the second temporarily bonded portion together define at least 50% of an upper surface area of the tabbed seal.

9. The tabbed sealing member of claim 1, wherein the first free portion and the second temporarily bonded portion together define at least 75% of an upper surface area of the tabbed seal.

10. The tabbed sealing member of claim 1, wherein the first free portion extends from an edge of the tabbed sealing member to an outer edge of the second temporarily bonded portion and the second temporarily bonded portion extends from the outer edge of the second temporarily bonded portion to an outer edge of the third permanently bonded portion.

11. The tabbed sealing member of claim 10, wherein the release layer extends between the outer edge of the second temporarily bonded portion and the outer edge of the third permanently bonded portion.

12. The tabbed sealing member of claim 1 wherein the tab layer is secured to the bonding layer to prevent the bonding layer from contacting at least one of the upper and lower laminate portions at the first free portion.

13. The tabbed sealing member of claim 1 wherein the release layer extends continuously between the first free portion and the third permanently bonded portion to help form the second temporarily bonded portion.

14. The tabbed sealing member of claim 1 wherein the tab layer is positioned between at least a portion of the release layer and the bonding layer at the first free portion.

15. A tabbed sealing member for sealing to a rim surrounding a container opening, the tabbed sealing member having an upper surface area, the tabbed sealing member comprising: a lower laminate portion including a sealant layer for sealing to the rim of the container and a support layer above the sealant layer; an upper laminate portion; a release layer; and a bonding layer partially bonding the upper laminate portion to the lower laminate portion to form a gripping tab, the gripping tab configured for removing the sealing member from the container opening; wherein the gripping tab is formed having a first free portion with an area less than 50% of the upper surface area, a second temporarily bonded portion that releases or ruptures prior to the tabbed seal being removed from the container, and a third permanently bonded portion that does not release or rupture prior to seal removal, the second temporarily bonded portion defined by at least a portion of the release layer; and wherein the second temporarily bonded portion extends continuously between the first free portion and the third permanently bonded portion the first free portion; and the second temporarily bonded portion having an area greater than 50% of the upper surface area, whereby a user can grasp the first free portion and the second temporarily bonded portion to remove the tabbed sealing member from the container.

16. The tabbed sealing member of claim 15, further comprising a tab layer including a tab stock having a release coating, the tab layer bonded to at least part of at least one of the upper and lower laminate portions.

17. The tabbed sealing member of claim 15, wherein the release layer forms part of at least one of the upper and lower laminate portions.

18. The tabbed sealing member of claim 15, wherein the bonding layer forms part of at least one of the upper and lower laminate portions.

19. The tabbed sealing member of claim 15, wherein at least a portion of the release layer ruptures such that portions of the release layer remain with both of the upper and lower laminate portions.

20. The tabbed sealing member of claim 15, wherein at least a portion of the release layer separates from one of the upper and lower laminate portions.

21. The tabbed sealing member of claim 15, further comprising a foil layer and wherein the sealant layer is a heat seal layer.

22. The tabbed sealing member of claim 15, wherein the first free portion and the second temporarily bonded portion together define at least 75% of an upper surface area of the tabbed seal.

23. A laminate for forming a tabbed sealing member for sealing to a rim surrounding a container opening, the laminate comprising: a lower laminate portion including a sealant layer for sealing to the rim of the container and a support layer above the sealant layer; an upper laminate portion; a release layer; a tab layer; and a bonding layer partially bonding the upper laminate portion to the lower laminate portion to form a gripping tab when the laminate is formed into the tabbed sealing member, the gripping tab configured for removing the sealing member from the container opening; wherein the laminate has a width with a first portion of the width having the upper and lower laminate portions being unbonded to one another adjacent a portion of the tab layer, a second portion of the width where the upper and lower laminate portions are temporarily bonded to one another via at least a portion of the release layer configured to release or rupture prior to the tabbed seal being removed from the container, and a third portion of the width where the upper and lower laminate portions are permanently bonded to one another via at least a portion of the bonding layer so as to not release or rupture prior to seal removal and; wherein the second temporarily bonded portion extends continuously between the first free portion and the third permanently bonded portion.

24. The laminate of claim 23, wherein the tab layer includes a tab stock having a release coating, the tab layer bonded to at least part of at least one of the upper and lower laminate portions.

25. The laminate of claim 23, wherein the release layer forms part of at least one of the upper and lower laminate portions.

* * * * *